United States Patent
Lamarque, III et al.

(10) Patent No.: US 6,690,651 B1
(45) Date of Patent: Feb. 10, 2004

(54) METHOD AND APPARATUS FOR AUTOMATIC TRANSFER OF A CALL IN A COMMUNICATIONS SYSTEM IN RESPONSE TO CHANGES IN QUALITY OF SERVICE

(75) Inventors: John X. Lamarque, III, McKinney, TX (US); John D. Rutledge, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/358,994

(22) Filed: Jul. 22, 1999

(51) Int. Cl.[7] .................................................. H04J 1/16
(52) U.S. Cl. ........................ 370/252; 370/352; 370/400
(58) Field of Search ................................. 370/352, 338, 370/252, 329, 280, 389, 353–356, 400, 401, 237; 709/227, 224; 379/9.04, 58.17, 201.03, 201; 703/21

(56) References Cited

U.S. PATENT DOCUMENTS

| | | | | |
|---|---|---|---|---|
| 6,154,445 A | * | 11/2000 | Farris et al. | 370/237 |
| 6,389,005 B1 | * | 5/2002 | Cruickshank | 370/252 |
| 6,449,259 B1 | * | 9/2002 | Allain et al. | 370/253 |

* cited by examiner

*Primary Examiner*—John Pezzlo

(57) ABSTRACT

A method and apparatus in a communications system for routing a voice call associated with a user. A quality of service is monitored for the voice call being routed through a path in a packet based network. Responsive to a quality of service failing to meet a quality of service threshold in the packet based network, a signal is sent to the user requesting a change in a routing of the voice call. Responsive to a reply from the user to change routing of the voice call from the user, the call is routed through another path.

74 Claims, 5 Drawing Sheets

METHOD AND APPARATUS FOR AUTOMATIC TRANSFER OF A CALL IN A COMMUNICATIONS SYSTEM IN RESPONSE TO CHANGES IN QUALITY OF SERVICE

CROSS REFERENCE TO RELATED APPLICATIONS

The present invention is related to application entitled METHOD AND APPARATUS FOR VOICE OVER INTERNET PROTOCOL SWAPPING IN A COMMUNICATIONS SYSTEM, Ser. No. 09/359,538, filed even date hereof, and assigned to the same assignee.

FIELD OF THE INVENTION

The present invention relates generally to communications systems and in particular to a method and apparatus for routing calls in a communications system. Still more particularly, the present invention relates to a method and apparatus for routing calls involving a packet based network within a communications system.

BACKGROUND OF THE INVENTION

Originally regarded as a novelty, Internet telephony is attracting more and more users because it offers tremendous cost savings relative to the traditional public switch network (PSTN) users can bypass long distance carriers and their permanent usage rates and run voice traffic over the Internet for a flat monthly Internet access fee. Internet telephony involves the use of voice over Internet protocol also referred to as "voice over IP" or "VoIP". This protocol is packet based in contrast to the switch circuit system in a PSTN. The ultimate objective of Internet telephony is a reliable high quality voice service of the kind users expect from a PSTN. Although progressing rapidly, Internet telephony still has some problems with reliability and sound quality. The level of reliability and sound quality expected is impacted by bandwidth limitations that lead to congestion and packet loss, which in turn, can cause delays in packet transmission. Delays also may be caused by packets arriving out of order, which results in packets being stored in a queue while waiting for other packets to arrive. These types of network delays can result in packets being lost or discarded.

In voice communications, packet loss manifests itself in the form of gaps or periods of silence in the conversation between users. These gaps or periods of silence lead up to a "clipped-speech" effect. Such a situation is unsatisfactory for most users and is unacceptable in business communications. Consequently, the use of voice over IP as a median for communications is limited based on the variability in quality of service. Therefore, it would be advantageous to have an improved method and apparatus for minimizing the effects of variability in the quality of service associated with voice over IP communications.

SUMMARY OF THE INVENTION

The present invention provides a method and apparatus for minimizing problems associated with quality of service levels involving IP and other packet based communications. A quality of service for a voice call being routed through a path in a packet based network to a user is monitored. Responsive to quality of service of the voice call failing to meet a quality of service threshold in the packet based network, a signal is sent to the user to see if the routing of the voice call should be changed to another path. The call is routed through another path in response to an indication from the user to change routing of the voice call.

Alternatively, the call may be automatically routed to another path instead of sending a query to the user. Also, the user may be allowed to enter a directory number to identify another path or destination for use in rerouting the call. The call may be rerouted to another path in the packet based network. Also, the call may be routed to a path in a switched circuit network, such as a PSTN.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
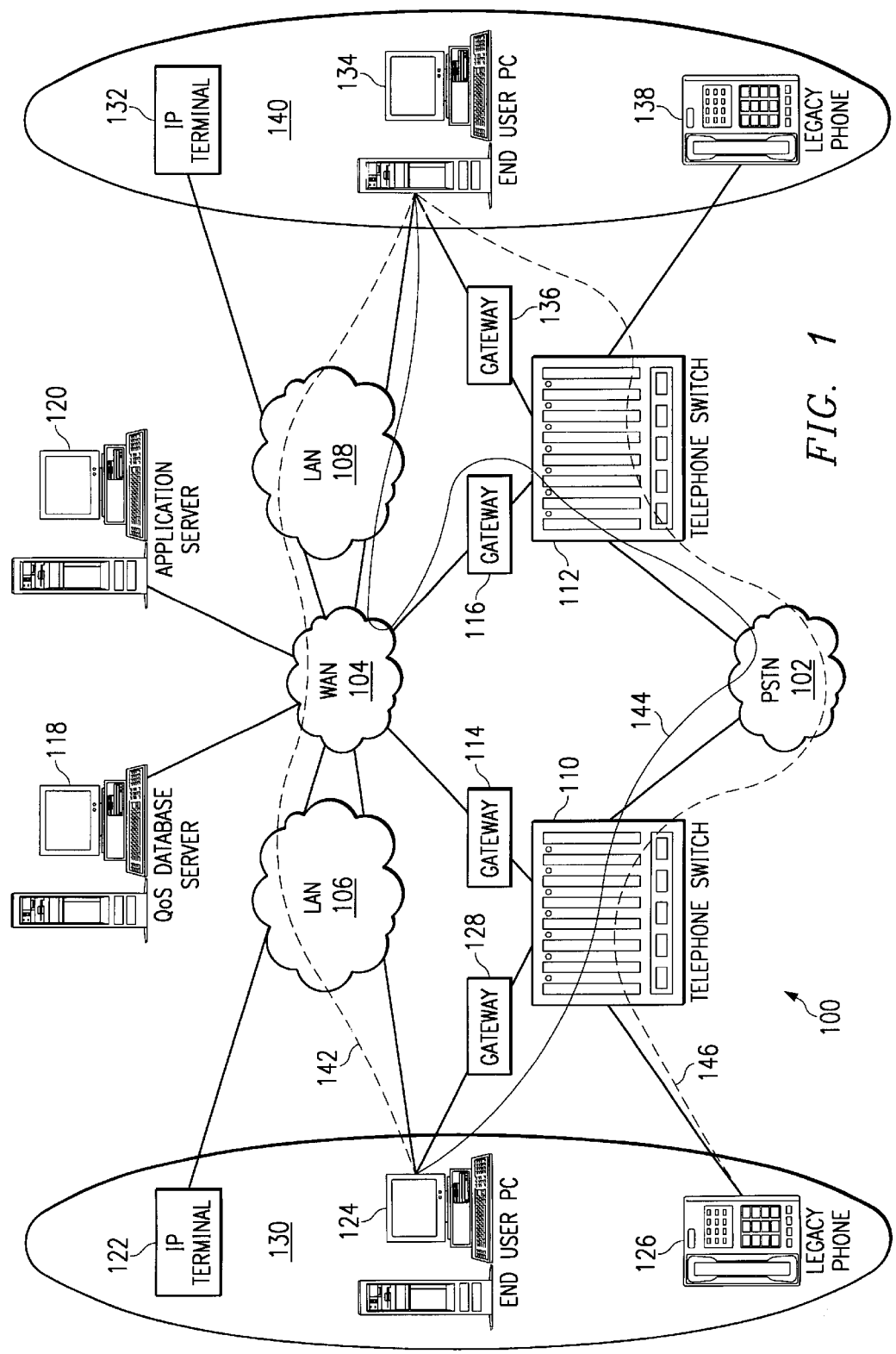
FIG. 1 is an illustration of a communications system depicted in accordance with a preferred embodiment of the present invention.

With reference now to the figures and in particular with reference to FIG. 1, an illustration of a communications system is depicted in accordance with a preferred embodiment of the present invention. Communications system 100 includes a public switch telephone network (PSTN) 102, a wide area network (WAN) 104, a local area network (LAN) 106, and a LAN 108. Telephone switch 110 and 112 are part of PSTN 102. PSTN 102 is a switched circuit network while WAN 104, LAN 106, LAN 108 are packet based networks. Gateway 114 provides a connection between WAN 104 and telephone switch 110 while gateway 116 provides a connection between WAN 104 and telephone switch 112. LAN 106 and LAN 108 are connected to WAN 104. A quality of service database server 118 and an application server 120 also are connected to WAN 104.

A number of terminals are present within communications system 100. IP terminal 122 and end user PC 124 have connections to LAN 106. IP terminal 122 may be, for example, a telephone configured for communication over a packet based network (e.g. WAN 104). Additionally, end user PC 124 also has a connection to telephone switch 110 via gateway 128. Legacy phone 126 is connected to telephone switch 110. A legacy phone in the depicted examples is a conventional landline phone for use with PSTN 102. In the depicted examples, these terminals are located in a geographic area 130.

IP terminal 132 has a connection to LAN 108. End user PC 134 has a connection to LAN 108 and telephone switch 112. The connection to telephone switch 112 is made via gateway 136. Legacy phone 138 has a connection to telephone switch 112. These three terminals are located in geographic area 140, which is in a location remote from geographic area 130.

Communications system 100 as depicted in FIG. 1 is intended as an illustrative example of a communications system in which the present invention may be implemented and not as an architectural limitation. For example, WAN 104 may be placed by the Internet, which is a world wide collection of networks. Further, intranets also may be present within communications system 100. Of course, other elements not shown may be contained within communications system 100.

In making a voice over IP call, a user may initiate a call at a terminal, such as IP terminal 122 or end user PC 124, in geographic area 130 to a terminal, such as IP terminal 132, end user PC 134, or legacy phone 138, in geographic area 140. The call may be routed to a number of different paths through communications system 100. For example, a call from end user PC 124 to end user PC 134 may employ a path 142 that is entirely through packet based networks. The path may run through a packet based network and a switched circuit network, such as path 144. These examples are illustrative, and many different routes may be used in which different portions of different networks are employed to route the call.

In accordance with the preferred embodiment of the present invention, a mechanism is provided within communications system 100 for rerouting calls when the quality of service on a packet based network, such as WAN 104, LAN 106, or LAN 108, fall below a quality of service that is acceptable or set for a subscriber. For example, if the quality of service for a call between end user PC 124 and end user PC 134 along path 142 falls below an acceptable threshold, the call may be rerouted to another path, such as path 144. Alternatively, the call may be rerouted to avoid packet based networks entirely. In such a rerouting, a subscriber may switch to a legacy phone, such as legacy phone 126 from end user PC 124 to continue the call using path 146.

Subscribers select a quality of service level with their local Internet service provider or telephone company. Either a pre-defined directory number can be assigned to transfer the call or the subscriber can have the option to enter in a directory number. In the depicted examples, the mechanism of the present invention monitors the quality of service of the call on the packet based network for the duration of the call. If the quality of service falls below a threshold set for the subscriber, then the subscriber is presented with the ability to transfer the call. The subscriber may be queried to determine whether the subscriber desires to transfer the call to another destination or path. For example, the subscriber may choose whether to have the call routed through a PSTN to a legacy phone or a cellular phone and possibly incur long distance charges. If the subscriber does not elect to have a call transferred, then no action occurs. Potentially, the user may be notified again if the quality of service continues to degrade. Alternatively, the call may be automatically transferred without queuing the subscriber.

The calls may be transferred or rerouted in a number of ways. For example, the path may be to another path having a higher quality of service on the packet based network or to a path through a legacy telephone environment. If the path is to a switched circuit network, such as a PSTN, directory number address digits for routing of the call may be sent to a switch. The switch translates the digits and rings the appropriate legacy telephone to complete the call transfer.

Figure 2:
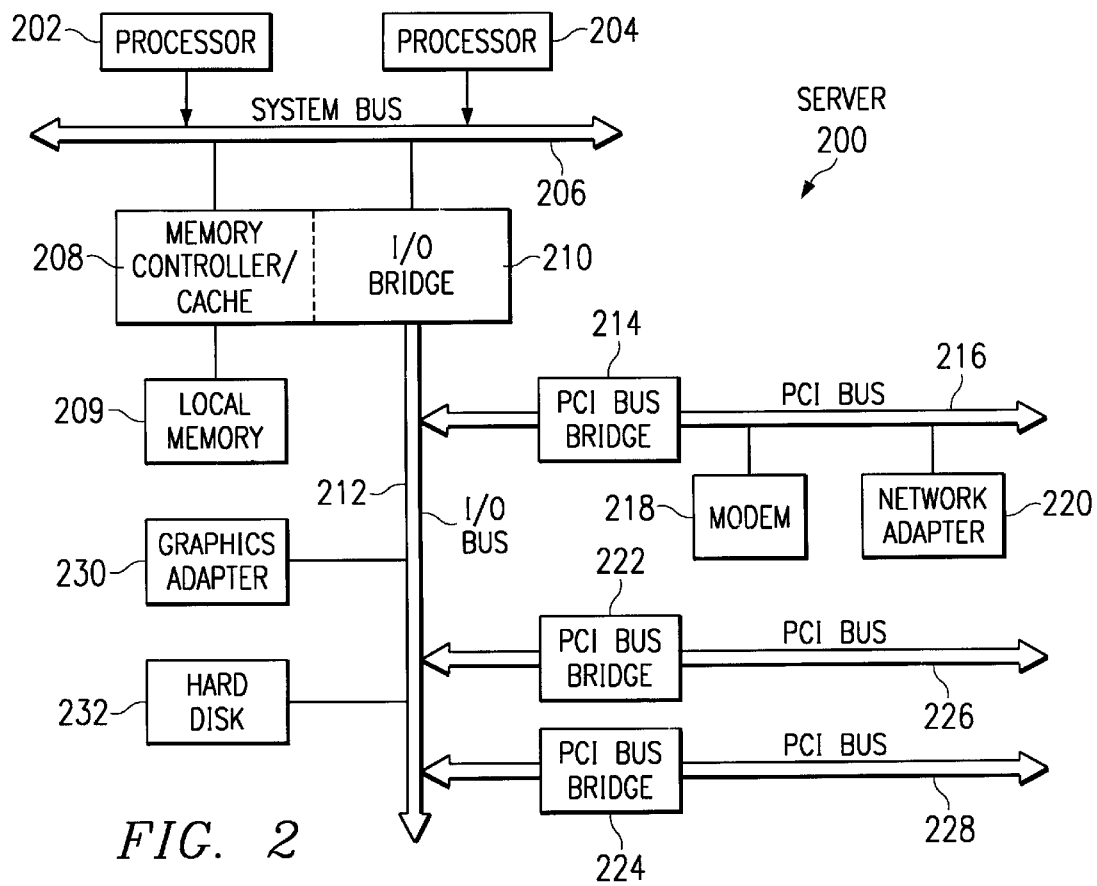
FIG. 2 is a block diagram depicting a data processing system that may be implemented as a server in accordance with a preferred embodiment of the present invention.

Referring to FIG. 2, a block diagram depicts a data processing system that may be implemented as a server in accordance with a preferred embodiment of the present invention. Data processing system 200 may be implemented as application server 120 in FIG. 1 or as a database server, such as a quality of service database server 118. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system. Furthermore, data processing system 200 may be implemented as an end user PC, such as end user PC 124 or end user PC 140. An adapter allowing a user to place voice calls would be added for use in an end user PC.

Figure 3:
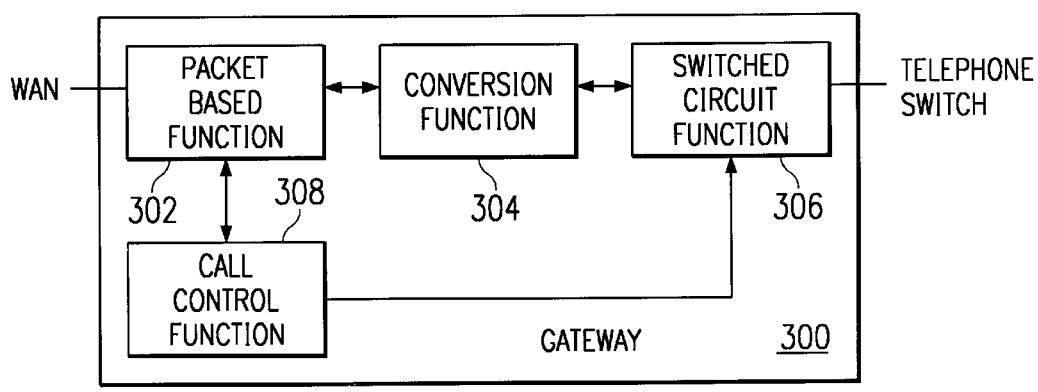
FIG. 3 is a block diagram of a gateway depicted in accordance with a preferred embodiment of the present invention.
Figure 4:
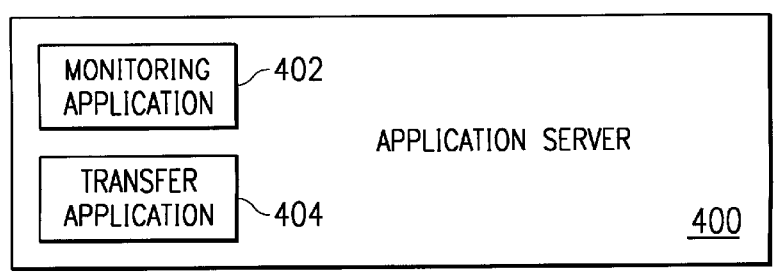
FIG. 4 is a block diagram illustrating functions in an application server depicted in accordance with a preferred embodiment of the present invention.
Figure 5:
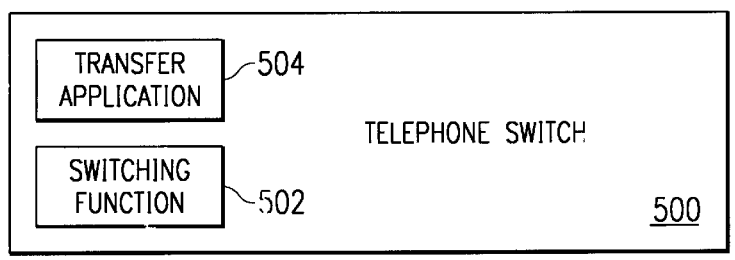
FIG. 5 is a block diagram of functions in a telephone switch depicted in accordance with a preferred embodiment of the present invention.

FIGS. 3–5 are block diagrams illustrating examples of components that may be used to implement the processes of the present invention. With reference now to FIG. 3, a block diagram of a gateway is depicted in accordance with a preferred embodiment of the present invention. Gateway 300 is an example of a gateway, such as gateways 114, 116, 128, or 136 in FIG. 1. Gateway 300 provides all of the logical and electrical translation functions required to provide communications between a packet based environment, such as WAN 104, and a switched circuit environment, such as PSTN telephone switch 110 in FIG. 1. The functions of gateway 300 are implemented along International Telecommunications Union's ITU-T Recommendation H.323, which is a standard describing systems and equipment for use in providing multi-media communications over packet based networks. Gateway 300 in FIG. 3 contains a packet based function 302, which serves to communicate with packet based network devices. Switch circuit function 306 in gateway 300 is employed to communicate with switched circuit network devices. Conversion function 304 provides conversion of data and other signals between the two environments. For example, if a voice call is flowing from a telephone switch to a WAN using gateway 300, the telephony based traffic is compressed and placed into IP packets and routed on to the WAN.

Gateway 300 also may include gatekeeper functions, such as, for example, call routing and call control as well as basic telephony services. These functions include, for example, call transfer and call forwarding. The gatekeeper functions may be implemented in call control function 308. Call control function 308 also may provide access controls in which various devices or terminals must obtain permission for access before making or accepting a call. Call control function 308 also may include a directory service allowing a user to enter an alias address that is converted into a network address. This alias may be, for example, a telephone number, an extension number, or a name. Alternatively, these gatekeeper functions may be implemented separately from the other functions of gateway 300.

With reference now to FIG. 4, a block diagram illustrating functions in an application server is depicted in accordance with a preferred embodiment of the present invention. Application server 400 is an example of an application server, such as, application server 120 in FIG. 1. Monitoring application 402 is provided within application server 400 to monitor the quality of service for various calls across a packet based network. When the quality of service for a call falls below an acceptable level, monitoring application 402 will send a signal or call to transfer or change the path of the monitored call. In the depicted examples, if the path of the call is for another packet based network path, transfer application 404 in application server 400 will handle the transfer of the call to a new path. Otherwise, the call or signal will be made to a transfer application that is designed to change or transfer the path to one through a switched circuit network.

Turning to FIG. 5, a block diagram of functions in a telephone switch is depicted in accordance with a preferred embodiment of the present invention.

Telephone switch 500 may be implemented as telephone switch 110 or 112 in FIG. 1. Telephone switch 500 includes switching function 502, which is used to route calls. Additionally, transfer application 504 is present within telephone switch 500. This application will transfer a call to a path through a switched circuit network in response to a signal or call from a monitoring application to transfer the call.

Figure 6:
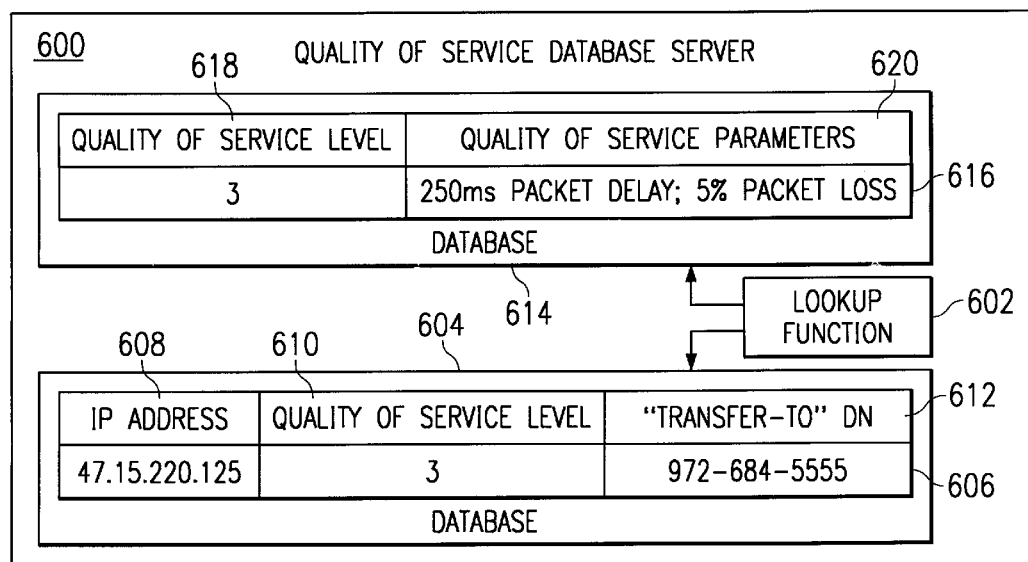
FIG. 6 is a diagram of components in a quality of service database server depicted in accordance with a preferred embodiment of the present invention.

With reference now to FIG. 6, a diagram of components in a quality of service database server is depicted in accordance with a preferred embodiment of the present invention. Quality of service database server 600 is an example of quality of service database server 118 in FIG. 1. Quality of service database server 600 provides a look up function 602 which is employed to search for entries in database 604 for a quality of service level for a subscriber. The IP address of the subscriber is used to search the entries in database 604.

Database 604 will contains entries, such as entry 606. Entry 606 includes an IP address field 608 along with a quality of service level field 610 for a particular subscriber. In this example, the IP address in IP address field 608 identifies a subscriber. Additionally, a transfer to directory number (DN) field 612 is an optional field, which may be used to identify a target DN to transfer the call in an automatic transfer. This target DN specifies a device to which a call should be routed, such as, for example, a cellular phone.

In this example, the quality of service level from quality of service level field 610 may be used to obtain quality of service level of parameters from database 614. This database contains entries such as entry 616, which includes a quality of service level field 618 and a quality of service parameters field 620. Different parameters may be defined for different quality of service levels in the depicted examples. The quality of service level returned from database 604 is used to obtain parameters for use by a monitoring application. The quality of service parameters may include, for example, packet delay and packet loss thresholds. The parameters identified may be returned to a monitoring application such as monitoring application 402 in FIG. 4.

Alternatively, database 614 may be located at the monitoring application. In this case, the quality of service level obtained from database 604 is returned to the monitoring application. Further, depending on the implementation, both database 604 and database 614 may be implemented within an application server, such as application server 120 instead of a quality of service database server, such as quality of service database server 118 in FIG. 1.

Figure 7:
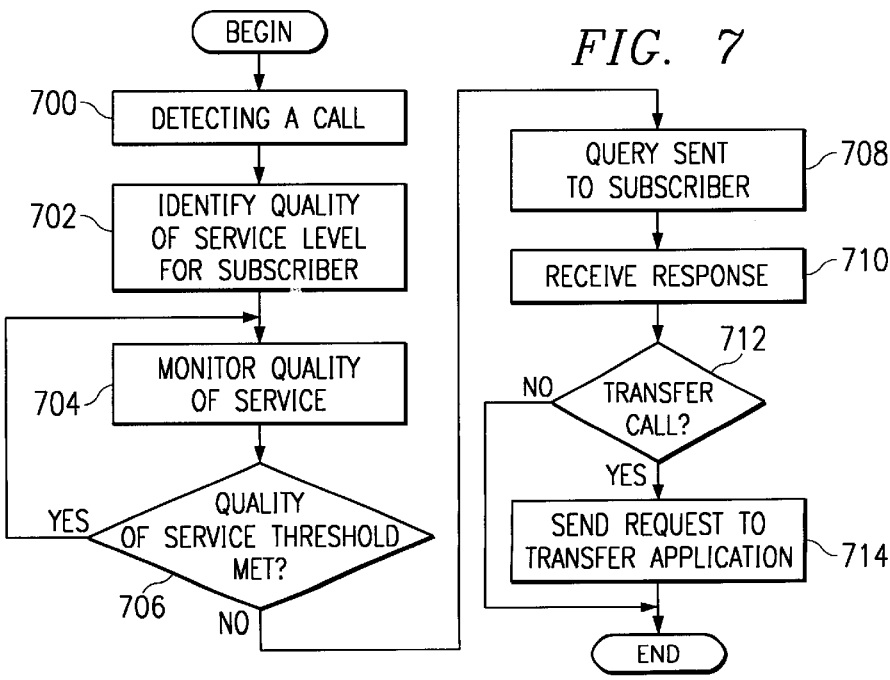
FIG. 7 is a flowchart of a process used by a monitoring application depicted in accordance with a preferred embodiment of the present invention.

With reference now to FIG. 7, a flowchart of a process used by a monitoring application is depicted in accordance with a preferred embodiment of the present invention. The process illustrated in this flowchart is one employed by a monitoring application such as monitoring application 402 in FIG. 4. The process begins by detecting a call terminating or originating from a terminal (step 700). The quality of service level for the subscriber is identified (step 702). The call is monitored for the quality of service (step 704). A determination is made as to whether the quality of service for the call meets the quality of service threshold for the subscriber's quality of service level (step 706). If the threshold for the quality of service is met, the process returns to step 704 to continue to monitor the quality of service for the call.

If the quality of service for the call falls below the threshold, a query is sent to the subscriber (step 708). This query prompts the subscriber to determine whether to transfer the call. The query may be, for example, in the form of a pop up message or as a tone. A response is received from the subscriber (step 710). This response contains an election as to whether to transfer the call. Also, the response may include a directory number to which the call is to be transferred in addition to an indication as to whether the call should be transferred. A determination is made as to whether the call should be transferred based on the response (step 712). If the call is to be transferred, a request is sent to a transfer application (step 714) with the process terminating thereafter. This request will include the directory number of the destination, which is obtained when the quality of service level is obtained or when a response is received from the subscriber. The transfer application may be, for example, transfer application 404 in FIG. 4 or transfer application 504 in FIG. 5.

Referring again to step 712, if it is determined that the subscriber has elected not to transfer the call, the process terminates. Further, if the subscriber chooses not to transfer the call, the process may continue to monitor the call to see if further degradation occurs in the quality of service for the call. In this instance, the process sends the subscriber another prompt or alert if such degradation continues.

With respect to steps 708 and 710, the steps may be omitted with the call being automatically transferred in response to the quality of service falling below the threshold identified for the subscriber.

Figure 8:
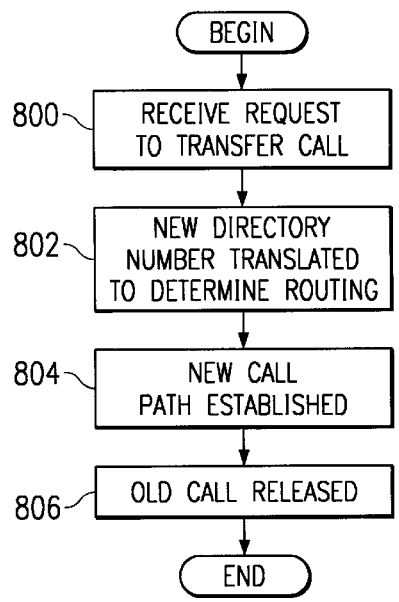
FIG. 8 is a flowchart of a process for transferring an application depicted in accordance with a preferred embodiment of the present invention.

With reference now to FIG. 8, a flowchart of a process for transferring an application is depicted in accordance with a preferred embodiment of the present invention. This process is implemented in a transfer application such as, for example, transfer application 404 in FIG. 4 or transfer application 504 in FIG. 5. The process begins by receiving a request to transfer a call (step 800). This request will include a directory number. The new directory number is translated to determine any applicable routing information, such as routing digits identifying an area code or country code (step 802). A new call path is then established using this information (step 804). The server or switch will process a new call using a different path which may be, for example, a legacy time division multiplexed phone call or another IP call. The old call path is then released (step 806) with the process terminating thereafter.

Figure 9:
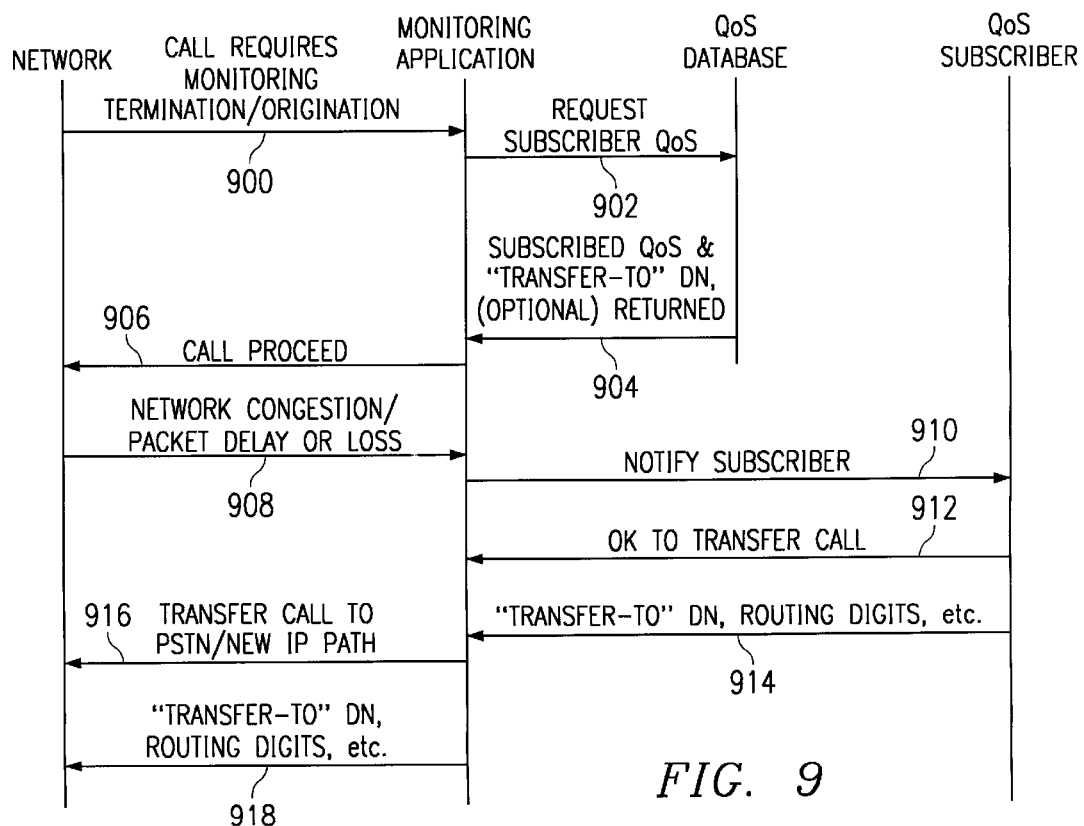
FIG. 9 is a message flow diagram for monitoring a call depicted in accordance with a preferred embodiment of the present invention.

With reference now to FIG. 9, a message flow diagram for monitoring a call is depicted in accordance with a preferred embodiment of the present invention. The message flow begins by the monitoring application receiving a call from the network requiring monitoring (step 900). The call received from the network will be an originating or terminating call for a terminal, such as, for example, IP terminal 122 or end user PC 124 in FIG. 1. The monitoring application makes a request for subscriber quality of service level (QoS) from a quality of service database (step 902). In response, the quality of service database returns the subscribed quality of service level and a "transfer to" DN to the monitoring application (step 904). The monitoring application then sends a message to the network to allow the call to proceed (step 906).

The monitoring application then obtains network congestion and/or packet delay or lost information from the network for the call (step 908). This information may be obtained from various known applications for "pinging" targets to obtain delay or packet loss data. This information is obtained on a continuous or periodic basis by the monitoring application in the depicted example. If the quality of service for the call is breached, a notification or prompt is sent to the subscriber (step 910). This notification may include a request to the subscriber to indicate whether the call should be transferred or rerouted to a new path. Additionally, the notification may request a directory number from the subscriber. In step 912, the subscriber has returned to the monitoring application an indication that the call should be transferred. Optionally, the indication may include a directory number (step 914).

The monitoring application then sends a request to the network to change the switch circuit network (e.g., PSTN) or a new path in the packet based network (e.g., IP network) (step 916). The monitoring application then sends the transfer to directory number, routing digits, and any other information needed to transfer or reroute the call to a new path (step 918).

Figure 10:
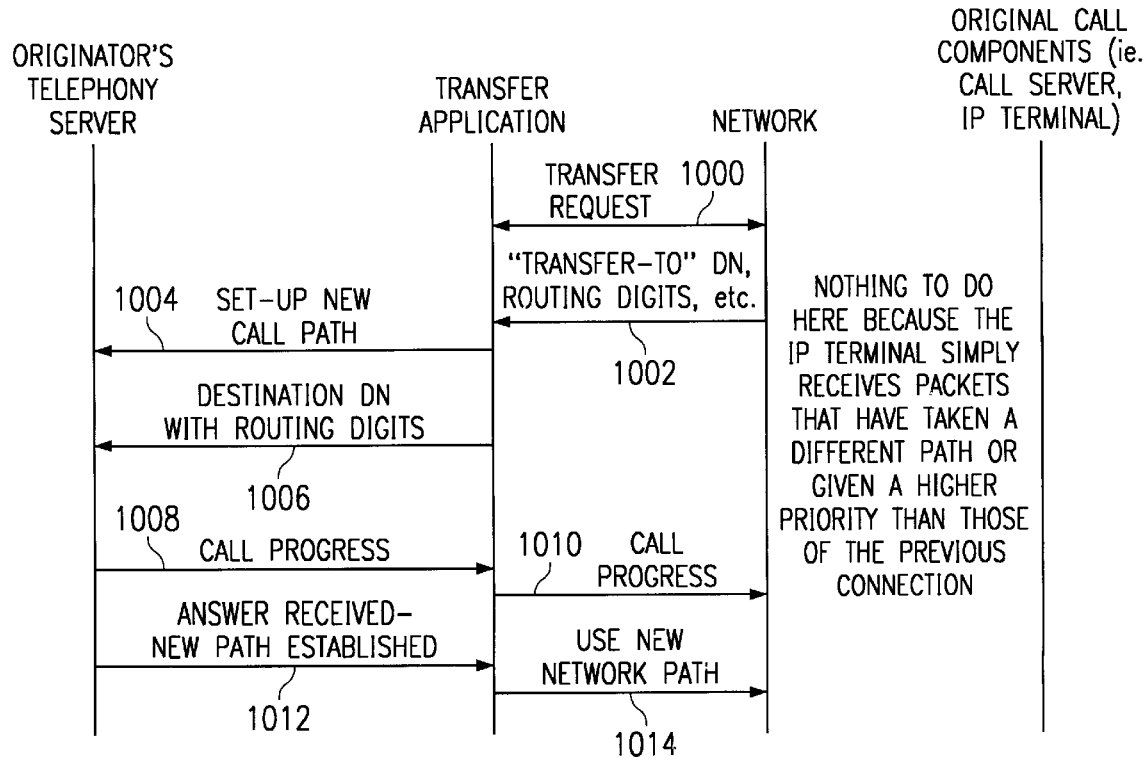
FIG. 10 is a message flow diagram for transferring a call from one packet based network path to another packet based network path depicted in accordance with a preferred embodiment of the present invention.

With reference now to FIG. 10, a message flow diagram for transferring a call from one packet based network path to another packet based network path is depicted in accordance with a preferred embodiment of the present invention. The transfer application receives a transfer request from the network (step 1000). This request is received from a monitoring application at an application server in the network. The transfer application also receives the transfer to directory number, routing digits, and any other information needed to transfer or reroute the call to a new path (step 1002). The additional information may include, for example, the directory number requesting the transfer. The transfer request and information is received from a monitoring application in the network. In the depicted examples, the monitoring application is located at an application server, such as application server 120 in FIG. 1. In the these examples, the transfer application also is located at the application server for call transfers that establish a new path within the packet based network. For calls requiring establishment of a path through a switched circuit network, such as PSTN 102, the transfer application is located at a telephone switch, such as telephone switch 110 or telephone switch 112 in FIG. 1.

The transfer application then sends a message to the server for the originator of the call to set up a new call path (step 1004). The transfer application also sends the destination directory number with routing digits to the server (step 1006). A call progress message is received by the transfer application from the server (step 1008). This call progress message is forwarded to the network (step 1010). The server will send an answer received message to the transfer application when a new path is established across the packet based network (step 1012). A server or computer on a LAN handling the call for the original path will receive this message. The transfer application will then send a message to the network to use the new network path (step 1014). A server or computer on a LAN handling the call for the original path will receive this message. The original call components will not perform any messaging in this example because the terminal will receive packets that have taken a different path or have been given a higher priority than those for the previous path or connection.

Figure 11:
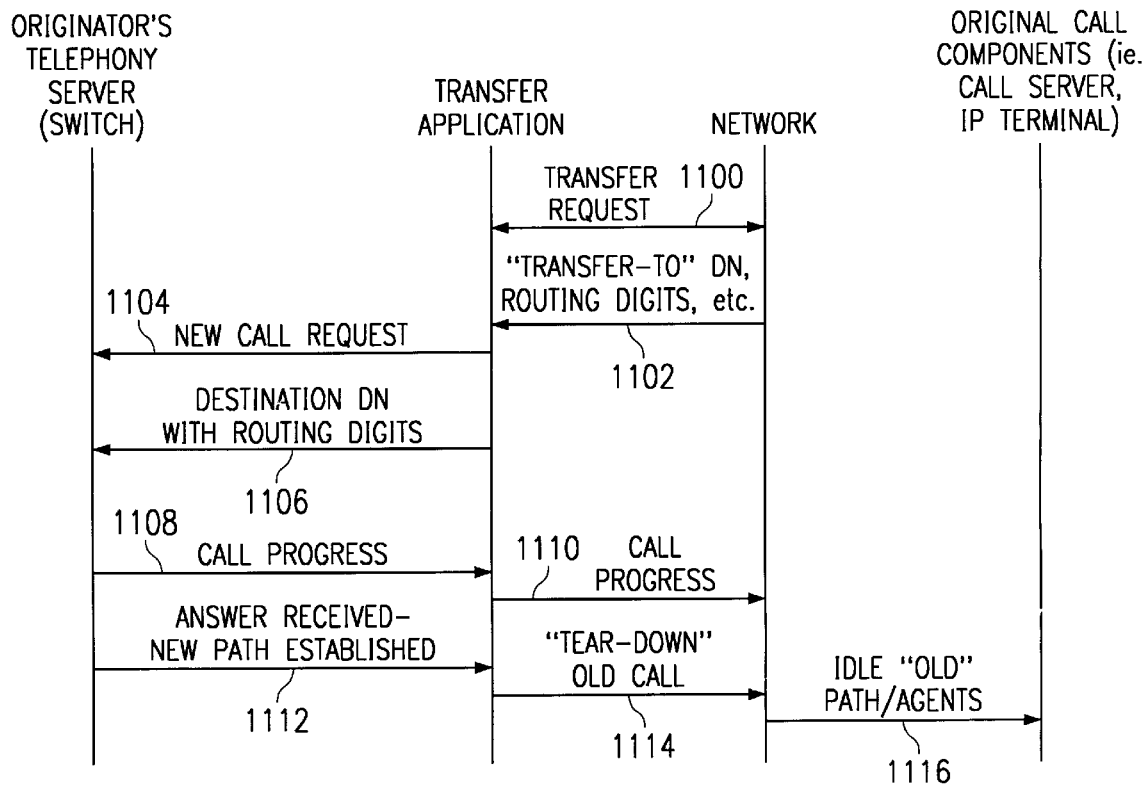
FIG. 11 is a message flow diagram for transferring a call to a switched circuit network path from a packet based network path depicted in accordance with a preferred embodiment of the present invention.

With reference next to FIG. 11, a message flow diagram for transferring a call to a switched circuit network path from a packet based network path is depicted in accordance with a preferred embodiment of the present invention. In this example, the transfer application is located at a telephone switch, such as telephone switch 110 or telephone switch 112 in FIG. 1. The transfer application receives a transfer request from the network (step 1100). This request is received from a monitoring application at an application server in the network. The transfer application also receives the transfer to directory number, routing digits, and any other information needed to transfer or reroute the call to a new path (step 1102). The additional information may include, for example, the directory number requesting the transfer. The transfer request and information is received from a monitoring application in the network.

Next, the transfer application then sends a new call request to the originator's server or a switch (step 1104). In addition, the destination directory number and routing digits are sent to this server/switch (step 1106). The server returns a call progress message to the transfer application (step 1108). At this time, the switch is attempting to establish a connection with a legacy phone or other terminal in communication with the switched circuit network (e.g. PSTN 102 in FIG. 1). This call progress message is used to tell the server or LAN in a network to maintain the path since the new path has not yet been established. The call progress message is forwarded to the network by the transfer application (step 1110). A server or computer on a LAN handling the call for the original path will receive this message.

Subsequently, when an answer is received establishing a new path, the switch sends a message to the transfer application (step 1112). The transfer application then sends a message to the network to tear down the old call (step 1114). This message allows the server or computer to idle the terminal on the packet based network and to free up resources. The network then sends a message to the original call components to idle the old path and agents (step 1116). A server or computer on a LAN handling the call for the original path will receive this message. At this time, the old agents or terminals in the packet based network are no longer used because a new path through the switched circuit network has been established.

Thus, the present invention provides a method and apparatus allowing a subscriber to transfer calls by election or automatically in response to a poor quality of service on a packet based network. This mechanism allows subscribers to take advantage of lower telephone rates and set a specific quality of service level for voice over IP calls. The present invention allows for a call to be transferred to a more reliable path, on a packet based network or a switched circuit network, if the quality of service set cannot be maintained. The mechanism is particularly useful for calls in progress when the quality of service degrades during the call.

It is important to note that while the present invention has been described in the context of a fully functioning communications system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links. The instructions may be executed by processors located at a switch or server in the communications system. In the depicted examples, the operating system may be Windows NT or UNIX. Windows NT is available from Microsoft Corporation.

The description of the present invention has been presented for purposes of illustration and description, but is not intended to be exhaustive or limited to the invention in the form disclosed. Many modifications and variations will be apparent to those of ordinary skill in the art. The various illustrated components used in providing monitoring and transferring of calls may be placed in different locations in the communications system other than those in the depicted examples. For example, the monitoring application in the depicted examples are located on an application server. Such a monitoring application may be located elsewhere in the communication system depending on the implementation. A terminal, such as an end user PC, is an example of a location at which a monitoring application may be placed. Further, although the depicted examples involve voice over IP, the processes may be applied to other packet based protocols. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a communications system for routing a voice call associated with a user, the method comprising:

monitoring a quality of service for the voice call being routed through a first path in a packet based network;

responsive to quality of service for the call failing to meet a quality of service threshold in the packet based network, sending a signal to the user requesting a change in a routing of the voice call; and responsive to a response from the user to change routing of the voice call from the user, routing the call through a second path, wherein the response from the user includes an identification specifying the second path through which the call is to be routed.

2. The method of claim 1, wherein the second path is a path through the packet based network.

3. The method of claim 2, wherein the packet based network is a wide area network.

4. The method of claim 2, wherein the packet based network is an Internet.

5. The method of claim 2, wherein the packet based network is an intranet.

6. The method of claim 1, wherein the packet based network uses an internet protocol to transfer data.

7. The method of claim 1, wherein the second path is a path through a switched circuit network.

8. The method of claim 7, wherein the switched circuit network is a public switch telephone network.

9. The method of claim 1, wherein the first path has an end at a terminal and wherein the second path has an end at a different terminal.

10. The method of claim 9, wherein the terminal is a computer associated with a user and the different terminal is a legacy phone associated with the user.

11. The method of claim 1, wherein the quality of service threshold is based on packet delay.

12. The method of claim 1, wherein the quality of service threshold is based on packet loss.

13. The method of claim 1, wherein the step of routing the call through the second path comprises routing the call through a previously selected path.

14. The method of claim 1 further comprising:

obtaining the quality of service threshold from a database.

15. The method of claim 1, wherein the user originates the call.

16. The method of claim 1, wherein the user receives the call.

17. A method in a communications system for routing a voice call, the method comprising:

detecting a voice call for a subscriber being routed over a first path of a packet based network;

monitoring a quality of service for the voice call, wherein the voice call is currently routed over the first path of the packet based network; and responsive to the quality of service failing to meet a level, changing the routing of the voice call to a second path in response to an event, wherein the event includes a user input containing an identifier specifying the second path.

18. The method of claim 17, wherein the step of monitoring the voice call comprises:
identifying a quality of service level associated with the subscriber; and
determining whether the quality of service of the voice call meets the quality of service level associated with the subscriber.

19. The method of claim 17, wherein the quality of service level is defined by an amount of packet delay over the data processing system network.

20. The method of claim 17, wherein the quality of service level is defined by an amount of packet loss over the data processing system network.

21. The method of claim 17, wherein the second path is through a switched circuit network.

22. The method of claim 17, wherein the event is an indication from the subscriber to change the routing of the voice call.

23. The method of claim 17, wherein the event is an identification that the voice call is to be automatically rerouted without an indication from the subscriber.

24. A data processing system for use in a communications system comprising:
detection means for detecting a voice call for a subscriber being routed over a first path of a packet based network;
monitoring means for monitoring a quality of service for the voice call, wherein the voice call is currently routed over the first path of the packet based network; and
rerouting means, responsive to the quality of service failing to meet a level, rerouting of the voice call to a second path in response to an event, wherein the event includes a user input containing an identifier specifying the second path.

25. The data processing system claim 24, wherein the monitoring means comprises:
identifying a quality of service level associated with the subscriber; and
determining whether the quality of service of the voice call meets the quality of service level associated with the subscriber.

26. The data processing system of claim 24, wherein the data processing system is a server.

27. The data processing system of claim 24, wherein the data processing system is a personal computer at which the subscriber is receiving the voice call.

28. The data processing system 24, wherein the data is a gateway between the packet based network and the switched circuit network.

29. The data processing system of claim 24, wherein the level is defined by an amount of packet delay over the data processing system network.

30. The data processing system of claim 24, wherein the level is defined by an amount of packet loss over the data processing system network.

31. A communications system comprising:
a switched circuit network;
a packet based network connected to the switched circuit network;
a first terminal connected to the switched circuit network, wherein calls routed to the first terminal are routed through the switched circuit network; and
a second terminal connected to the data processing system network, wherein the call to the second terminal are routed through the packet based network;
wherein the second terminal receives a call routed through the packet based system network; responsive to a quality of service of the call failing below a level, the user at the second terminal is queried to change the routing of the call; responsive to the user requesting a change in the routing of the call, routing the call to the first terminal, wherein the user request to change the routing of the call includes an identifier specifying a path to the first terminal.

32. The communications system of claim 31, wherein the first terminal is a landline telephone.

33. The communications system of claim 31, wherein the first terminal is a wireless telephone.

34. The communications system of claim 31, wherein the second terminal is a personal computer.

35. The communications system of claim 31, wherein the level is defined by an amount of packet delay over the data processing system network.

36. The communications system of claim 31, wherein the level is defined by an amount of packet loss over the data processing system network.

37. An computer comprising:
a communications unit configured for connection to a packet based network;
a processing unit; and
a memory unit containing applications including a monitoring application, wherein the monitoring application detects a call using a packet based network involving a user; obtains a quality of service threshold in response to detecting the call; monitors the quality of service for the call using the quality of service threshold, sends an alert to the user to decide whether to transfer the call using the communications unit in response to the quality of service being below the quality of service threshold, and initiates a transfer of the call in response to an indication by the communications unit from the user to transfer the call, wherein the indication by the communications unit includes an identifier specifying a path through which the user indicates the call is to be routed.

38. The computer of claim 37, wherein the communications unit is an input/output adapter.

39. The computer of claim 37, wherein the computer is an application server.

40. The computer of claim 37, wherein the computer is a terminal at which a user participates in a call.

41. The computer of claim 37, wherein monitoring application initiates the transfer of the call without sending an alert and receiving an indication in response to a presence of an indication to automatically transfer the call in response to the quality of service for the call falling below the quality of service threshold.

42. The computer of claim 37, wherein the quality of service is defined by an amount of packet delay over the data processing system network.

43. The computer of claim 37, wherein the quality of service is defined by an amount of packet loss over the data processing system network.

44. An apparatus comprising:
a communications unit configured for connection to a packet based network;
a processing unit; and
a memory unit containing applications including a transfer application, wherein the transfer application receives through the communications unit a request to transfer a call in response to a determination that a quality of service of the call has failed to meet a predetermined threshold, receives routing information input by a user of the apparatus, in response to the determination that the quality of service of the call has failed to meet the predetermined threshold, to route the call using a new path, and executes commands to transfer the call to the new path.

45. The apparatus of claim 44, wherein the apparatus is a telephone switch.

46. The apparatus of claim 44, wherein the apparatus is a server computer.

47. The apparatus of claim 44, wherein the new path is a path through a switched circuit network.

48. The apparatus of claim 44, wherein the switched circuit network is a public switch telephone network.

49. The apparatus of claim 44, wherein the new path is a path through a packet based network.

50. A communications system for routing a voice call associated with a user, the communications system comprising:
   monitoring means for monitoring a quality of service for the voice call being routed through a first path in a packet based network;
   sending means, responsive to the quality of service for the call failing to meet a quality of service threshold in the packet based network, for sending a signal to the user requesting a change in a routing of the voice call; and
   routing means, responsive to a response from the user to change routing of the voice call from the user, for routing the call through a second path, wherein the response from the user includes an identifier specifying the second path through which the call is to be routed.

51. The communications system of claim 50, wherein the second path is a path through the packet based network.

52. The communications system of claim 51, wherein the packet based network is a wide area network.

53. The communications system of claim 51, wherein the packet based network is an Internet.

54. The communications system of claim 51, wherein the packet based network is an intranet.

55. The communications system of claim 50, wherein the packet based network uses an internet protocol to transfer data.

56. The communications system of claim 50, wherein the second path is a path through a switched circuit network.

57. The communications system of claim 56, wherein the switched circuit network is a public switch telephone network.

58. The communications system of claim 50, wherein the first path has an end at a terminal and wherein the second path has an end at a different terminal.

59. The communications system of claim 58, wherein the terminal is a computer associated with a user and the different terminal is a legacy phone associated with the user.

60. The communications system of claim 50, wherein the quality of service threshold is based on packet delay.

61. The communications system of claim 50, wherein the quality of service threshold is based on packet loss.

62. The communications system of claim 51, wherein the routing means comprises means for routing the call through the second previously selected path.

63. The communications system of claim 50, further comprising:
   obtaining the quality of service threshold from a database.

64. The communications system of claim 50, wherein the user originates the call.

65. The communications system of claim 50, wherein the user receives the call.

66. A communications system for routing a voice call, the communications system comprising:
   detecting means for detecting a voice call for a subscriber being routed over a first path of a packet based network;
   monitoring means for monitoring a quality of service for the voice call, wherein the voice call is currently routed over the first path of the packet based network; and
   changing means, responsive to the quality of service failing to meet a level, for changing the routing of the voice call to a second path in response to an event, wherein the event includes a user input containing an identifier specifying the second path.

67. The communications system of claim 66, wherein the means of monitoring the voice call comprises:
   identifying means for identifying a quality of service level associated with the subscriber; and
   determining means for determining whether the quality of service of the voice call meets the quality of service level associated with the subscriber.

68. The communications system of claim 66, wherein the quality of service level is defined by an amount of packet delay over the data processing system network.

69. The communications system of claim 66, wherein the quality of service level is defined by an amount of packet loss over the data processing system network.

70. The communications system of claim 66, wherein the second path is through a switched circuit network.

71. The communications system of claim 66, wherein the event is an indication from the subscriber to change the routing of the voice call.

72. The communications system of claim 66, wherein the event is an identification that the voice call is to be automatically rerouted without an indication from the subscriber.

73. A computer program product in a computer readable medium for routing a voice call in a communications system, the computer program product comprising:
   first instructions for monitoring a quality of service for the voice call being routed through a first path in a packet based network in association with a user;
   second instructions, responsive to the quality of service failing to meet a quality of service threshold in the packet based network, for sending a signal to the user requesting a change in a routing of the voice call; and
   third instructions, responsive to a response from the user to change routing of the voice call from the user, for routing the call through a second path, wherein the response from the user includes an identifier specifying the second path trough which the call is to be routed.

74. A computer program product in a computer readable medium for routing a voice call in a communications system, the computer program product comprising:
   first instructions for detecting a voice call for a subscriber being routed over a first path of a packet based network;
   second instructions for monitoring a quality of service for the voice call, wherein the voice call is currently routed over the first path of the packet based network; and
   third instructions, responsive to the quality of service failing to meet a level, for changing the routing of the voice call to a second path in response to an event, wherein the event includes a user input containing an identifier specifying the second path.

* * * * *

UNITED STATES PATENT AND TRADEMARK OFFICE
CERTIFICATE OF CORRECTION

PATENT NO. : 6,690,651 B1
DATED : February 10, 2004
INVENTOR(S) : Lamarque, III et al.

It is certified that error appears in the above-identified patent and that said Letters Patent is hereby corrected as shown below:

Column 10,
Line 19, after "responsive to" insert -- the --.

Column 12,
Line 6, after "call" delete "failing" and insert -- falling --.

Column 13,
Line 61, after "claim" delete "51" and insert -- 50 --.

Signed and Sealed this

Thirtieth Day of May, 2006

JON W. DUDAS
*Director of the United States Patent and Trademark Office*